(12) United States Patent
Tsirkin et al.

(10) Patent No.: US 9,575,788 B2
(45) Date of Patent: Feb. 21, 2017

(54) HYPERVISOR HANDLING OF PROCESSOR HOTPLUG REQUESTS

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 271 days.

(21) Appl. No.: 13/603,305

(22) Filed: Sep. 4, 2012

(65) Prior Publication Data

US 2014/0068605 A1    Mar. 6, 2014

(51) Int. Cl.
*G06F 9/455* (2006.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2209/504* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 8,209,512 B1* | 6/2012 | Rhine et al. | 711/170 |
| 8,495,648 B1* | 7/2013 | Brandwine et al. | 718/104 |
| 2009/0089780 A1* | 4/2009 | Johnson et al. | 718/1 |
| 2009/0113422 A1* | 4/2009 | Kani | 718/1 |
| 2012/0278800 A1* | 11/2012 | Nicholas et al. | 718/1 |
| 2013/0227549 A1* | 8/2013 | Accapadi et al. | 718/1 |

* cited by examiner

*Primary Examiner* — Dong Kim
(74) *Attorney, Agent, or Firm* — Lowenstein Sandler LLP

(57) ABSTRACT

A system and method are disclosed for determining whether to grant requests for additional virtual processors for a virtual machine (referred to as "processor hotplug requests"). In accordance with one embodiment, a hypervisor receives a request from a guest operating system of a virtual machine, where the request is for an additional virtual processor for the virtual machine. The hypervisor then determines whether or not to grant the request based on a policy.

9 Claims, 3 Drawing Sheets

HYPERVISOR HANDLING OF PROCESSOR HOTPLUG REQUESTS

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, in either a one-to-one or one-to-many fashion, to a physical device of the host machine (e.g., a network interface device, a CD-ROM drive, etc.). The hypervisor typically manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
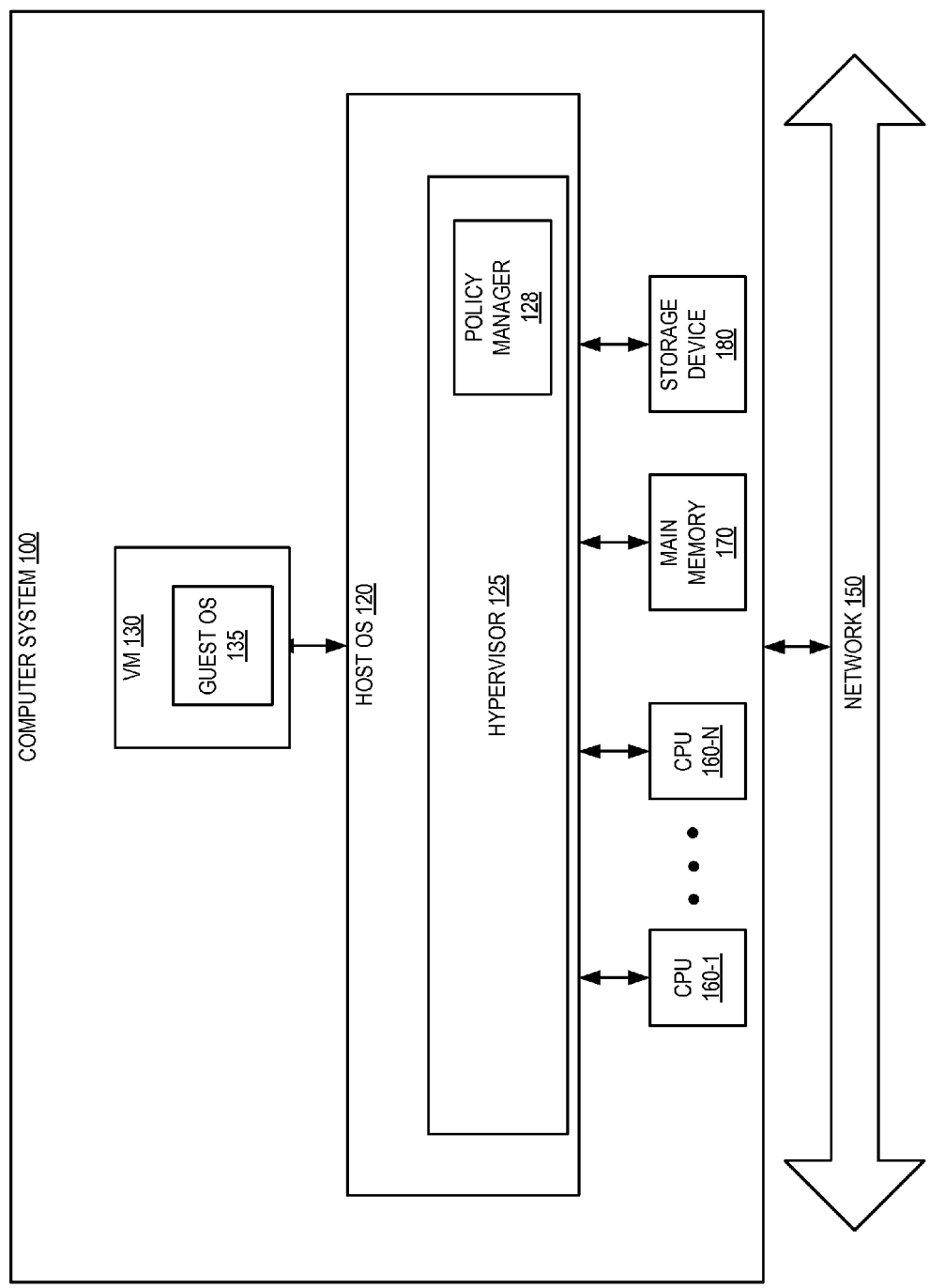
FIG. 1 depicts an exemplary computer system architecture, in accordance with an embodiment of the present invention.

Described herein is a system and method by which a hypervisor determines whether or not to grant a request from a guest operating system (OS) for an additional virtual processor (such requests are referred to as "processor hotplug requests." More particularly, in accordance with one embodiment, when the hypervisor receives a processor hotplug request from a guest OS of a virtual machine (VM), the hypervisor determines whether the request is consistent with a processor hotplug policy, and then grants the request when the request is consistent with the policy. In one embodiment, the policy may specify one or more conditions pertaining to a measure of utilization of one or more physical processors of the computer system (e.g., a condition stating that non-idle time of any central processing unit [CPU] should not exceed 80%, a condition stating that a CPU may run a maximum of three virtual processors, etc.). In some embodiments, the policy may be defined by an administrator (e.g., via a configuration file, via a graphical user interface, etc.), while in some other embodiments the policy may be hard-coded in the hypervisor. In some embodiments, the guest OS may specify in its request an identifier of a particular virtual processor in the virtual machine.

In accordance with one embodiment, the hypervisor notifies the guest operating system when the request is granted, and specifies an identifier of the virtual processor that is allocated to the virtual machine. When the hypervisor determines that the request is not to be granted, the hypervisor may similarly notify the guest OS that the request has been denied, and may specify a reason for why the request is denied.

In one embodiment, the guest OS may specify in its request a particular group of virtual processors called a virtual proximity domain for the additional virtual processor. More specifically, when the computer system comprises a non-uniform memory access (NUMA) memory, where memory access time depends on the memory location relative to the physical processors of the computer system, the virtual proximity domain may be a particular virtual NUMA node of the virtual machine.

In one embodiment, when the hypervisor determines that the processor hotplug request is to be granted, the hypervisor may select a particular group of physical processors called a physical proximity domain (or "proximity domain," for short) for the physical processor that will run the additional virtual processor. More specifically, when the computer system comprises a NUMA memory, the selected proximity domain may be a particular physical NUMA node (or simply "NUMA node"). In accordance with one embodiment, when the hypervisor notifies the guest operating system that the processor hotplug request has been granted, the notification may identify the selected proximity domain as well as the virtual processor that is allocated to the virtual machine.

In some embodiments, the hypervisor may select a proximity domain having a physical processor that is running a virtual processor of the virtual proximity domain specified in the guest OS's request. In some other embodiments, the hypervisor may select a proximity domain having a physical processor that has previously run a virtual processor of the virtual proximity domain specified in the guest OS's request. In still other embodiments, the hypervisor may select a proximity domain having a physical processor that is scheduled to run, in the future, a virtual processor of the virtual proximity domain specified in the guest OS's request.

Embodiments of the present disclosure are thus capable of handling processor hotplug requests from guest operating systems in an intelligent fashion. More particularly, embodiments of the present disclosure enable a hypervisor to decide whether granting a particular processor hotplug request is consistent with a given policy, and to process the request accordingly. Moreover, embodiments of the present disclosure enable a hypervisor to handle processor hotplug requests in a dynamic fashion, without requiring shutdown and restarting of the virtual machine.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises one or more central processing units (CPUs) 160-1 through 160-N, where N is a positive integer, main memory 170, which may include volatile memory devices (e.g., random access memory (RAM)), non-volatile memory devices (e.g., flash memory) and/or other types of memory devices, and a storage device 180 (e.g., one or more hard disk drives, solid-state drives, etc.). In some embodiments, main memory 170 may be non-uniform access (NUMA), such that memory access time depends on the memory location relative to CPUs 160-1 through 160-N.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 runs a host operating system (OS) 120, which manages the hardware resources of the computer system and that provides functions such as interprocess communication, scheduling, memory management, and so forth. In one embodiment, host operating system 120 also comprises a hypervisor 125, which provides a virtual operating platform for virtual machine 130 and manages its execution. In one embodiment, hypervisor 125 includes a policy manager 128 that is capable of receiving processor hotplug requests from guest OS 135 and determining whether the request should be granted based on a policy, as described in detail below with respect to FIG. 2. It should be noted that in some alternative embodiments, hypervisor 125 may be external to host OS 120, rather than embedded within host OS 120, or may replace host OS 120.

Virtual machine (VM) 130 is a software implementation of a machine that executes programs as though it were an actual physical machine. As shown in FIG. 1, virtual machine 130 has a guest operating system (OS) 135 that handles the execution of applications within the virtual machine. It should be noted that although, for simplicity, a single virtual machine 130 is depicted in FIG. 1, in some other embodiments computer system 100 may host a plurality of VMs 130.

Figure 2:
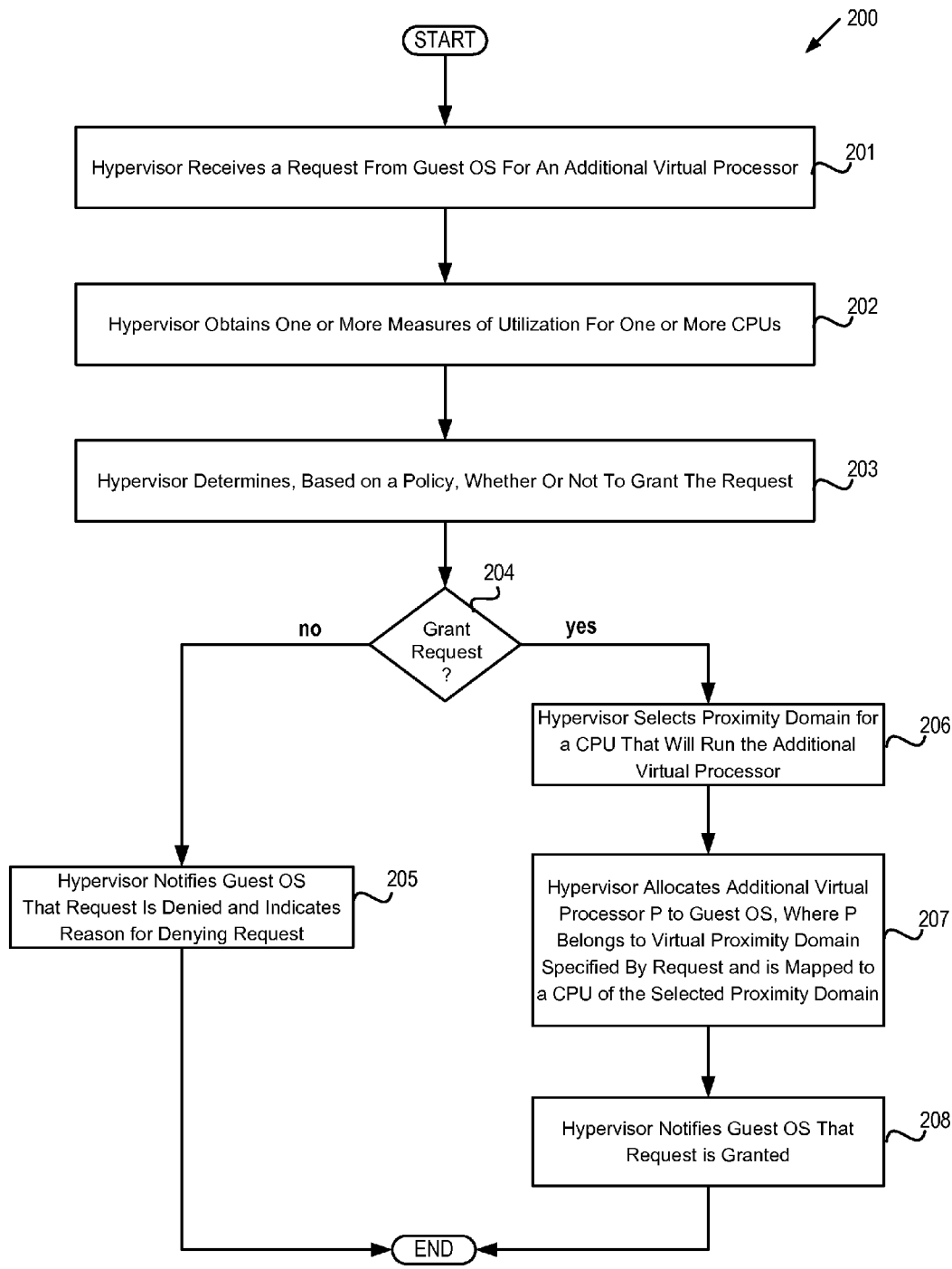
FIG. 2 depicts a flow diagram of one embodiment of a method by which a hypervisor processes a request from a guest operating system for an additional virtual processor.

FIG. 2 depicts a flow diagram of one embodiment of a method 200 by which a hypervisor processes a request from a guest operating system for an additional virtual processor. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that blocks depicted in FIG. 2 can be performed simultaneously or in a different order than that depicted.

At block 201, hypervisor 125 receives a request from guest operating system 135 for an additional virtual processor (i.e., a processor hotplug request). In some embodiments, the request may specify an identifier of a particular virtual processor of VM 130, or a virtual proximity domain for the additional virtual processor, or both. In one embodiment, the request is received by policy manager 128 of hypervisor 125. It should be noted that for embodiments in which memory 170 is non-uniform memory access (NUMA), the virtual proximity domain may be a particular virtual NUMA node of VM 130.

At block 202, hypervisor 125 obtains one or more measures of utilization for one or more CPUs 160. Such measures of utilization may include the percentage of time that a particular CPU 160 is non-idle, the number of virtual processors that are run by a particular CPU 160, the number of threads in a runnable state executed by a particular CPU 160, and so forth. In one embodiment, block 202 is performed by policy manager 128 of hypervisor 125.

At block 203, hypervisor 125 determines, based on a processor hotplug policy, whether or not to grant the processor hotplug request. In one embodiment, the policy specifies one or more conditions pertaining to one or more measures of CPU utilization, and hypervisor 125 determines whether allocating an additional virtual processor to VM 130 will violate any of the conditions of the policy. In some embodiments, the policy may be defined by an administrator (e.g., via a configuration file, via a graphical user interface, etc.), while in some other embodiments the policy may be hard-coded in policy manager 128 of hypervisor 125.

Block 204 branches based on the determination of block 204. If hypervisor 125 determined that the request is not to be granted, execution proceeds to block 205, otherwise execution continues at block 206.

At block 205, hypervisor 125 notifies guest operating system 135 that the request has been denied. In some embodiments, the notification may also indicate to guest OS 135 the reason that the request was denied (e.g., the particular condition of the policy that would be violated if the request were granted, etc.). In one embodiment, block 205 is performed by policy manager 128 of hypervisor 125. After block 205, the method of FIG. 2 terminates.

At block 206, hypervisor 125 selects one of a plurality of proximity domains for a CPU 160 that will run the additional virtual processor. In some embodiments, hypervisor 125 may select a proximity domain with a CPU that is currently running a virtual processor of the virtual proximity domain specified in the guest OS's request. In some other embodiments, hypervisor 125 may select a proximity domain with a CPU that has previously run a virtual processor of the virtual proximity domain specified in the guest OS's request. In still other embodiments, hypervisor 125 may select a proximity domain with a CPU that is scheduled to run, in the future, a virtual processor of the virtual proximity domain specified in the guest OS's request.

It should be noted that for embodiments in which memory 170 is non-uniform memory access (NUMA), the selected proximity domain may be a particular NUMA node. In one embodiment, block 206 is performed by policy manager 128 of hypervisor 125.

At block 207, hypervisor 125 allocates an additional virtual processor P to guest OS 135, where P belongs to the virtual proximity domain specified in the request, and where P is mapped to a CPU 160 of the proximity domain selected at block 206. In one embodiment, block 207 is performed by policy manager 128 of hypervisor 125.

At block 208, hypervisor 125 notifies guest OS 135 that the request has been granted. In some embodiments, the notification may also specify an identifier of virtual processor P, or an identifier of the virtual proximity domain that virtual processor P belongs to, or both. In one embodiment, block 207 is performed by policy manager 128 of hypervisor 125.

Figure 3:
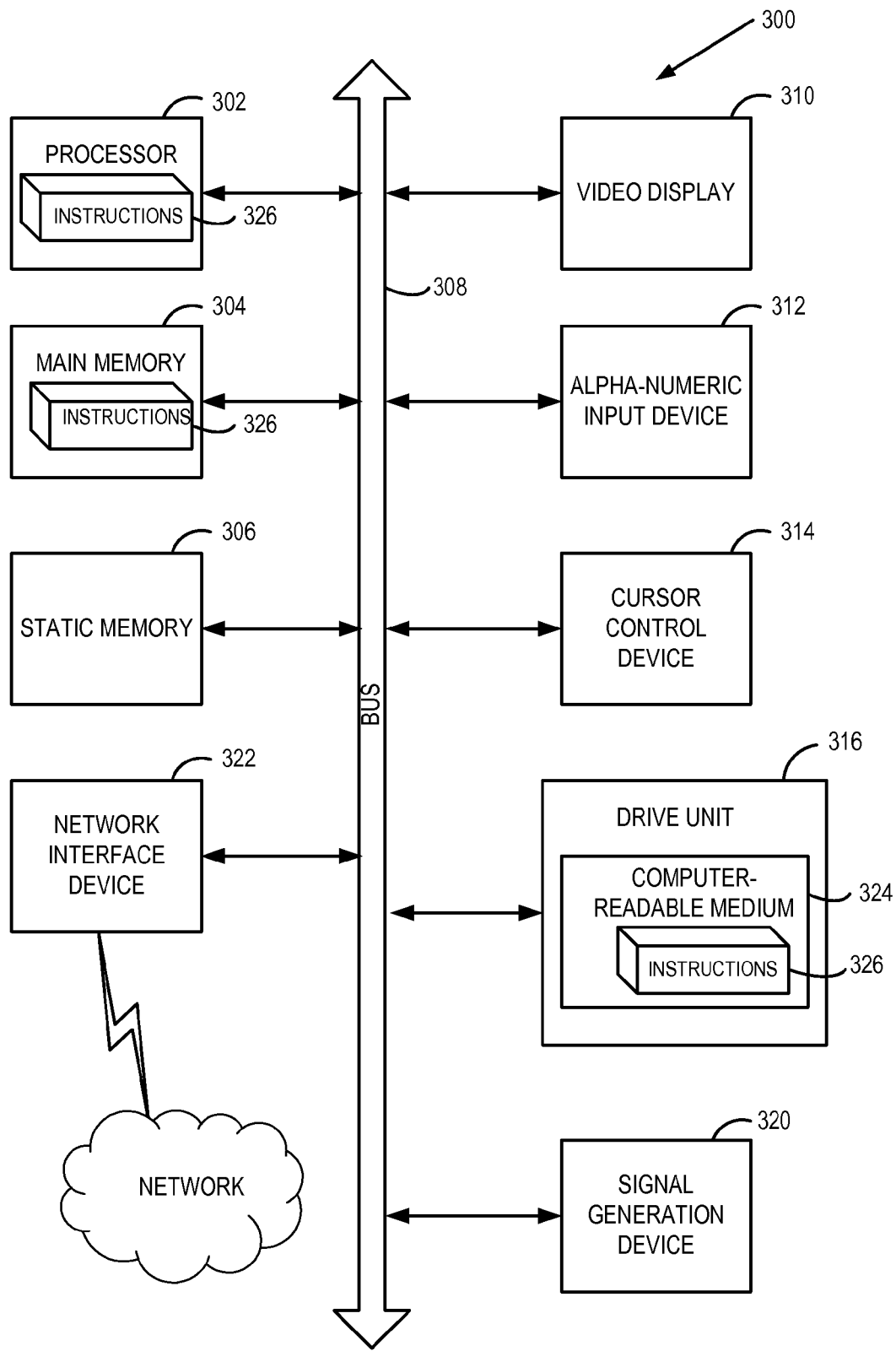
FIG. 3 depicts a block diagram of an illustrative computer system operating in accordance with embodiments of the invention.

FIG. 3 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the method of FIG. 2, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving by a physical processor executing a hypervisor, from a guest operating system of a virtual machine, a request for an additional virtual processor, wherein the request specifies a virtual proximity domain comprising a first virtual processor and a second virtual processor;
    selecting from a plurality of physical proximity domains, via the hypervisor, a physical proximity domain that comprises a first physical processor and a second physical processor, wherein the first physical processor currently runs the first virtual processor and is scheduled to run the second virtual processor, and wherein the second physical processor currently runs the second virtual processor; and
    allocating to the guest operating system, via the hypervisor, a virtual processor of the specified virtual proximity domain that is mapped to a physical processor of the selected physical proximity domain.

2. The method of claim 1 wherein the first physical processor and the second physical processor belong to a computer system, and wherein the method further comprises determining whether to grant the request in view of a measure of utilization of one or more physical processors of the computer system.

3. The method of claim 2 further comprising:
    granting the request; and
    notifying the guest operating system, via the hypervisor, that the request is granted, wherein the notification identifies the selected physical proximity domain and specifies an identifier of the virtual processor allocated to the guest operating system.

4. A computer system comprising:
    a memory; and
    a physical processor of a computer system, operatively coupled to the memory, to execute a hypervisor to:
        receive, from a guest operating system of a virtual machine, a request for an additional virtual processor wherein the request specifies a virtual proximity domain comprising a first virtual processor and a second virtual processor;
        select, from a plurality of physical proximity domains, a physical proximity domain that comprises a first physical processor and a second physical processor, wherein the first physical processor currently runs the first virtual processor and is scheduled to run the second virtual processor, and wherein the second physical processor currently runs the second virtual processor; and
        allocate to the guest operating system a virtual processor of the specified virtual proximity domain that is mapped to a physical processor of the selected physical proximity domain.

5. The system of claim 4 wherein the first physical processor and the second physical processor belong to the computer system, and wherein the hypervisor is further to determine whether to grant the request for the additional virtual processor in view of a measure of utilization of one or more physical processors of the computer system.

6. The system of claim 5 wherein the hypervisor is further to:
    grant the request; and
    notify the guest operating system that the request is granted, wherein the notification identifies the selected physical proximity domain and specifies an identifier of the virtual processor allocated to the guest operating system.

7. A non-transitory computer readable storage medium, having instructions stored therein that, when executed by a physical processor running a hypervisor, cause the physical processor to:
    receive by the physical processor via the hypervisor, from a guest operating system of a virtual machine, a request for an additional virtual processor wherein the request specifies a virtual proximity domain comprising a first virtual processor and a second virtual processor;
    select from a plurality of physical proximity domains, via the hypervisor, a physical proximity domain that comprises a first physical processor and a second physical processor, wherein the first physical processor currently runs the first virtual processor and is scheduled to run the second virtual processor, and wherein the second physical processor currently runs the second virtual processor; and
    allocate to the guest operating system, via the hypervisor, a virtual processor of the specified virtual proximity domain that is mapped to a physical processor of the selected physical proximity domain.

8. The non-transitory computer readable storage medium of claim 7 wherein the first physical processor and the second physical processor belong to a computer system, and wherein the instructions further cause the physical processor to determine, via the hypervisor, whether to grant the request in view of a measure of utilization of one or more physical processors of the computer system.

9. The non-transitory computer readable storage medium of claim 8 wherein the instructions further cause the physical processor to:

grant the request; and
notify the guest operating system, via the hypervisor, that the request is granted, wherein the notification identifies the selected physical proximity domain and specifies an identifier of the virtual processor allocated to the guest operating system.

\* \* \* \* \*